(12) United States Patent
Jones et al.

(10) Patent No.: US 10,927,971 B2
(45) Date of Patent: Feb. 23, 2021

(54) FAUCETS

(71) Applicant: Kohler Mira Limited, Cheltenham (GB)

(72) Inventors: Oliver Jones, Gloucester (GB); Austin Bumpsteed, Pershore (GB); Karl Feamley, Bristol (GB)

(73) Assignee: KOHLER MIRA LIMITED

( * ) Notice: Subject to any disclaimer, the term of this patent is extended or adjusted under 35 U.S.C. 154(b) by 54 days.

(21) Appl. No.: 15/781,657

(22) PCT Filed: Dec. 2, 2016

(86) PCT No.: PCT/GB2016/053811
§ 371 (c)(1),
(2) Date: Jun. 5, 2018

(87) PCT Pub. No.: WO2017/103570
PCT Pub. Date: Jun. 22, 2017

(65) Prior Publication Data
US 2018/0355988 A1    Dec. 13, 2018

(30) Foreign Application Priority Data

Dec. 17, 2015  (GB) .................................... 1522325

(51) Int. Cl.
| F16K 11/00 | (2006.01) |
| G05D 23/13 | (2006.01) |
| F16K 31/528 | (2006.01) |
| F16K 21/12 | (2006.01) |

(52) U.S. Cl.
CPC ............ *F16K 19/006* (2013.01); *F16K 21/12* (2013.01); *F16K 31/5288* (2013.01); *G05D 23/1353* (2013.01)

(58) Field of Classification Search
None
See application file for complete search history.

(56) References Cited

U.S. PATENT DOCUMENTS

| 2,889,113 A | 6/1959 | Kozel et al. |
| 2,905,386 A | 9/1959 | Rimsha et al. |
| 3,001,717 A | 9/1961 | Rimsha et al. |
| (Continued) | | |

FOREIGN PATENT DOCUMENTS

| CN | 202360861 | 8/2012 |
| CN | 202659974 U | 1/2013 |
| (Continued) | | |

OTHER PUBLICATIONS

International Search Report re Application No. PCT/GB2016/053811; 2 pages.

(Continued)

*Primary Examiner* — Henry T Crenshaw
(74) *Attorney, Agent, or Firm* — Foley & Lardner LLP

(57) ABSTRACT

A mixer valve (1) comprises a body (5) extending in a first direction between a front end and a rear end. The body (5) defines a volume (5a); a thermostatic cartridge (15) is received in the volume (5a), and a diaphragm valve (21) is received in the volume (5a) between the thermostatic cartridge (15) and the rear end of the body (5). The diaphragm valve (21) is operable in response to actuation of a push operated control member (23) to control flow of water from the mixer valve (1).

20 Claims, 14 Drawing Sheets

(56) References Cited

U.S. PATENT DOCUMENTS

| | | | |
|---|---|---|---|
| 3,079,950 A | 3/1963 | Rimsha | |
| 3,140,727 A | 7/1964 | Cutler | |
| 3,370,609 A | 2/1968 | Botnick | |
| 3,658,094 A | 4/1972 | Botnick | |
| 3,898,737 A | 8/1975 | Cope | |
| 3,921,659 A * | 11/1975 | Rudewick, III | F16K 11/0746 137/98 |
| 4,290,450 A | 9/1981 | Swanson | |
| 4,462,944 A | 7/1984 | Sprick | |
| 4,768,553 A | 9/1988 | Marx | |
| 4,868,935 A | 9/1989 | Weelden | |
| 4,893,653 A | 1/1990 | Ferrigno | |
| 5,074,520 A | 12/1991 | Lee et al. | |
| 5,205,313 A * | 4/1993 | Moretti | F16K 35/14 137/112 |
| 5,340,018 A * | 8/1994 | MacDonald | G05D 23/1353 236/12.2 |
| 5,441,075 A | 8/1995 | Clare | |
| 5,524,862 A | 6/1996 | Feraboli | |
| 6,109,288 A | 8/2000 | Al-Hamlan | |
| 6,131,340 A | 10/2000 | Clark et al. | |
| 2002/0011523 A1 | 1/2002 | Procter | |
| 2005/0258258 A1 | 11/2005 | Jonte | |
| 2006/0191572 A1* | 8/2006 | Breda | E03C 1/023 137/119.05 |
| 2006/0230575 A1 | 10/2006 | Quinn et al. | |
| 2008/0023498 A1 | 1/2008 | Bertin et al. | |
| 2012/0091379 A1 | 4/2012 | Todman et al. | |
| 2014/0261744 A1* | 9/2014 | Sansum | G05D 23/1353 137/15.18 |
| 2014/0261749 A1* | 9/2014 | Chen | E03C 1/057 137/78.1 |
| 2014/0261779 A1* | 9/2014 | Niver | F16K 11/074 137/468 |

FOREIGN PATENT DOCUMENTS

| | | |
|---|---|---|
| CN | 203500558 U | 3/2014 |
| DE | 21 41 712 | 3/1973 |
| DE | 71 31 840 | 7/1974 |
| DE | 24 08 208 | 9/1975 |
| EP | 0 913 29 | 10/1983 |
| EP | 0288643 | 11/1988 |
| EP | 0 947 902 | 10/1999 |
| EP | 0947902 | 10/1999 |
| EP | 2 239 486 | 10/2010 |
| EP | 2239486 | 10/2011 |
| GB | 0 643 486 | 9/1950 |
| GB | 0 655 593 | 7/1951 |
| GB | 0 660 450 | 11/1951 |
| GB | 0 712 413 | 7/1954 |
| GB | 0 720 346 | 12/1954 |
| GB | 0 736 698 | 9/1955 |
| GB | 0 805 735 A | 12/1958 |
| GB | 0 817 232 A | 7/1959 |
| GB | 0 875 237 A | 8/1961 |
| GB | 1 149 086 A | 4/1969 |
| GB | 1 153 655 A | 5/1969 |
| GB | 1 379 485 A | 1/1975 |
| GB | 2246188 | 1/1992 |
| GB | 2 255 615 A | 11/1992 |
| GB | 2 485 571 A | 5/2012 |
| JP | S62-172413 A | 7/1987 |
| JP | H07-246240 A | 9/1995 |
| JP | 2004-092066 A | 3/2004 |
| JP | 2004-092068 A | 3/2004 |
| JP | 2004-092069 A | 3/2004 |
| JP | 2005-113644 A | 4/2005 |
| JP | 2005-213908 A | 8/2005 |
| JP | 2009-030316 A | 2/2009 |
| KR | 200362932 Y1 | 9/2004 |
| WO | WO91/17380 | 11/1991 |
| WO | WO-92/01833 A1 | 2/1992 |
| WO | WO-99/66270 A1 | 12/1999 |
| WO | WO2011/159300 | 12/2011 |
| WO | WO-2014/076242 | 5/2014 |
| WO | WO2015/079444 | 6/2015 |

OTHER PUBLICATIONS

UK International Search Report re Application No. GB1601083.7; 2 pages.
Examination Report EP Appln No. 16808784.9; 5 pages.

* cited by examiner

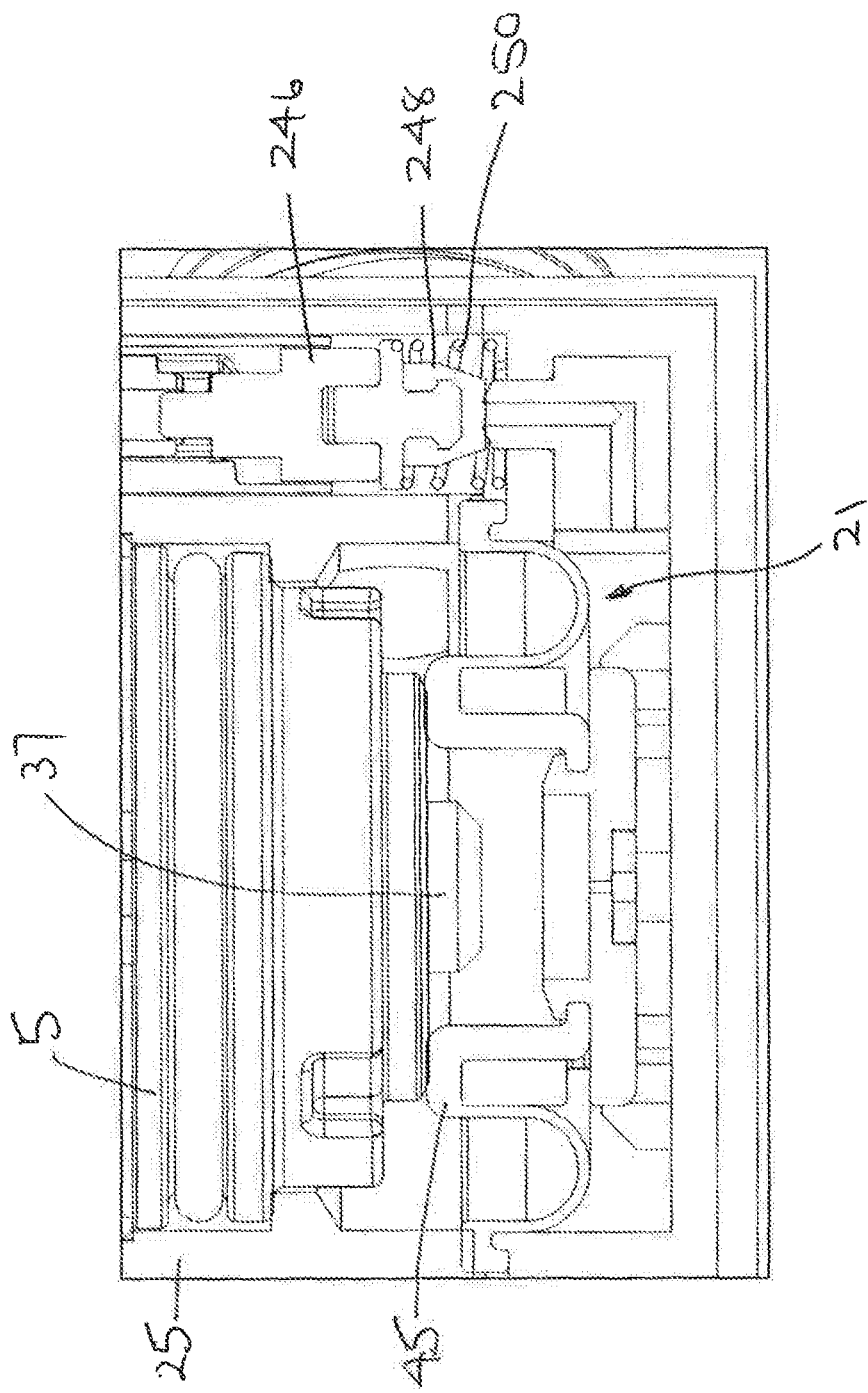

FAUCETS

CROSS-REFERENCE TO RELATED PATENT APPLICATIONS

This application is a U.S. National Stage application based on International Application PCT/GB2016/053811, filed Dec. 2, 2016, which claims the benefit of and priority to United Kingdom Patent Application No. 1522325.8, filed Dec. 17, 2015. The applications referenced in this paragraph are explicitly incorporated herein by reference in their entireties.

BACKGROUND

The present invention relates to faucets. In particular, but not exclusively, the present invention relates to a mixer valve incorporating a diaphragm valve that can be activated by a push operated control member. The present invention also relates to a dual control. In particular, but not exclusively, the present invention relates to a dual control having a push operated control member and an independently operable rotatable control member.

A mechanical mixer valve is a valve which mixes hot and cold water without requiring an electricity supply to operate. They may be used in, for example, showers. Typically, mechanical mixers allow the user to control temperature and flow of the water from the valve. In some arrangements, a single rotatable control member is provided for controlling temperature and flow. In other arrangements, separate rotatable control members are provided for independently controlling temperature and flow.

However there is increasing interest in being able simplify operation for ease of use such as with a push button. To implement push button control using known methods would require high input forces and/or stroke lengths in comparison to what is expected of a push button operated product.

Accordingly, there is a need for a mixer valve having integrated flow and temperature control, where the flow is controlled at the push of a control member. There is also a need for a dual control that allows a rotatable control member to operate independently of a push control member.

SUMMARY

According to a first aspect of the invention, there is provided a mixer valve comprising a body extending in a first direction between a front end and a rear end, the body defining a volume, a thermostatic cartridge received in the volume, and a diaphragm valve received in the volume between the thermostatic cartridge and the rear end of the body, wherein the diaphragm valve is operable in response to actuation of a push operated control member to control flow of water from the mixer valve.

It may be that an inner or rear end of the thermostatic cartridge is provided with an outlet spaced from the rear end of the body and the diaphragm valve is provided at the outlet of the thermostatic cartridge to control flow of water from the thermostatic cartridge outlet to a mixer valve outlet.

It may be that the diaphragm valve comprises a diaphragm valve member movable towards and away from the outlet of the thermostatic cartridge in response to a pressure differential across the diaphragm valve member.

It may be that the diaphragm valve member engages with a valve seat to close the outlet of thermostatic cartridge when the diaphragm valve is closed to prevent flow of water from the outlet of the thermostatic cartridge to the mixer valve outlet.

It may be that the diaphragm valve member disengages from the valve seat to open the outlet of the thermostatic cartridge when the diaphragm valve is open to allow flow of water from the outlet of the thermostatic cartridge to the mixer valve outlet.

It may be that the diaphragm valve member comprises a flexible diaphragm. The diaphragm may be made of elastomeric material. The diaphragm may comprise a rolling edge diaphragm. The diaphragm may include a support member. The support member may be made of plastics material.

It may be that the diaphragm separates an outlet chamber on a first side of the diaphragm from a control chamber on a second side of the diaphragm. The outlet chamber may be in fluid communication with the mixer valve outlet. The diaphragm valve member may control flow of water from the outlet of the thermostatic cartridge to the outlet chamber.

It may be that the diaphragm valve includes a leak path between the outlet chamber and the control chamber. The leak path may be provided by a bleed hole in the diaphragm. The diaphragm valve may be configured so that the diaphragm does not seal the leak path in the open position. For example, the underside of the diaphragm may be provided with or engage a stop or similar device that is configured to keep the leak path open.

It may be that a guide member is arranged to guide the movement of the diaphragm such that the movement is substantially linear between the open and closed positions of the diaphragm valve. The guide member may be received in the bleed hole. The bleed hole may be arranged at the centre of the diaphragm. The guide member may comprise a pin.

It may be that means is provided to restrict movement of the diaphragm to open the diaphragm valve for controlling a flow rate of water flowing from the outlet of the thermostatic cartridge to the mixer valve outlet.

It may be that a bypass controls flow of water from the control chamber to the outlet chamber in response to actuation of the push operated control member to control the pressure differential across the diaphragm for opening and closing the diaphragm valve. In some embodiments, the bypass and push operated control member are part of the mixer valve. In other embodiments, the bypass and push operated control member are configured for remote operation of the mixer valve.

It may be that the control chamber communicates with an inlet of the bypass and the outlet chamber communicates with an outlet of the bypass. The bypass may comprise a bypass valve controlling flow of water from the inlet to the outlet of the bypass.

It may be that the inlet and the outlet of the bypass are isolated when the bypass valve is closed to prevent flow of water from the control chamber to the outlet chamber.

It may be that the inlet and outlet of the bypass are connected when the bypass valve is open to allow flow of water from the control chamber to the outlet chamber.

It may be that the bypass valve comprises a bypass valve member movable between a closed position preventing flow through the bypass and an open position allowing flow through the bypass.

It may be that the bypass valve member is movable between the closed and open positions in response to actuation of the push operated control member.

It may be that the bypass valve member is urged to one of the closed and open positions by biasing means such as a spring.

It may be that the bypass valve member is received in a bypass chamber within at least a portion of the mixer valve body.

It may be that the bypass chamber is located adjacent to the volume between the front and rear end of the body.

It may be that the push operated control member for actuating the bypass valve is provided at the front end of the body. The push operated control member may be arranged for actuating movement in the first direction. The push operated control member may be a push button.

It may be that the bypass valve is operatively connected to the push operated control member by an indexing mechanism configured to control movement of the bypass valve member to open and close the bypass in response to actuation of the push operated control member.

It may be that each actuation of the push operated control member causes a changeover in the position of the bypass valve between the closed and open positions.

It may be that the indexing mechanism comprises a first indexing element coupled to the push operated control member for actuating the bypass valve and a second indexing element coupled to a rotatable control member for actuating the thermostatic cartridge to control temperature and/or flow rate of water delivered from the outlet of the thermostatic cartridge to the mixer valve outlet.

It may be that the first and second indexing elements are arranged concentrically around a central axis to be linearly displaced relative to each other along the central axis and rotationally displaced relative to each other around the central axis.

It may be that the first indexing element is configured for linear displacement relative to the second indexing element, independently of the relative rotational displacement of the first indexing element and the second indexing element.

It may be that the second indexing element is configured for rotational displacement relative to the first indexing element, independently of the relative liner displacement of the first indexing element and the second indexing element.

It may be that an overpressure relief is provided such that an excess fluid pressure within the thermostatic cartridge may be vented. The overpressure relief may be closed below a pre-determined fluid pressure and configured to open at or above the predetermined fluid pressure. The overpressure relief may vent excess fluid pressure within the thermostatic cartridge to the mixer valve outlet. In some embodiments the overpressure relief is separate from the bypass. In other embodiments the overpressure relief and bypass are combined.

According to a second aspect of the invention, there is provided a mixer valve having first and second inlets for connection to first and second supplies of water having different temperatures and an outlet for mixed water, a push operated control member, a diaphragm valve arranged to control flow of water from the outlet in response to actuation of the push button, and a cartridge arranged to control mixing of the first and second supplies of water, wherein the cartridge is disposed between the push button and the diaphragm valve.

The mixer valve according to the second aspect of the invention may comprise any of the features of the mixer valve according to the first aspect of the invention.

According to a third aspect of the invention, there is provided a mixer valve comprising a body extending in a first direction between a front end and a rear end, the body defining a volume, a thermostatic cartridge received in the volume, a mixer valve outlet, a diaphragm valve arranged to control the flow of water from the mixer valve outlet, and a relief valve arranged to actuate the diaphragm valve, the relief valve being actuable by a push operated control member, wherein the relief valve is formed at least in part adjacent to the volume and between the front end and rear end of the body.

The mixer valve according to the third aspect of the invention may comprise any of the features of the mixer valve according to the first aspect of the invention.

According to a fourth aspect of the invention, there is provided a faucet comprising a push operated control member, a diaphragm valve arranged to control flow of water from an outlet of the faucet in response to actuation of the push operated control member, and a valve arranged to control temperature and/or flow rate of outlet water, wherein the valve is disposed between the push operated control member and the diaphragm valve.

The valve may be a mixer valve for controlling mixing of two fluids having different temperatures, for example hot and cold water. The mixer valve may be a thermostatic or non-thermostatic mixer valve. The mixer valve may comprise a cartridge having a first end and a second end. The push operated control member may be arranged at the first end of the cartridge. The diaphragm valve may be arranged at the second end of the cartridge. The push operated control member may be operatively connected to the diaphragm valve. The diaphragm valve may be configured to switch between open and closed positions in response to actuation of the push operated control member for allowing and preventing fluid flow from the outlet.

The mixer valve may comprise any feature of the mixer valve according to any of the preceding aspects of the invention.

According to a fifth aspect of the invention there is provided a dual control comprising a first input device, the first input device being actuable in a linear direction along a first axis; a second input device, the second input device being actuable by rotation around the first axis; a first indexing element arranged around the first axis and coupled to the first input device, the first indexing element having a first circumferential groove in its side; a second indexing element arranged concentrically with the first indexing element, the second indexing element having a second circumferential groove in its side, the second circumferential groove facing the first circumferential groove, the first circumferential groove and the second circumferential groove crossing at an intersection point; and a third indexing element trapped at the intersection point and coupling the first indexing element and the second indexing element, and being free to rotate around an axis radial to the first axis, wherein actuation of the first input device causes relative linear displacement of the first and second indexing elements along the first axis and actuation of the second input device causes relative rotation of the first and second indexing elements around the first axis; and wherein the first and second circumferential grooves are arranged such that the first indexing element is rotationally stationary upon actuation of the first input device or the second input device.

It may be that the second indexing element is rotationally stationary upon actuation of the first input device, and wherein the third indexing element is rotationally stationary upon actuation of the second input device.

It may be that the first and second circumferential grooves are arranged to restrain the first indexing element in two or more different linear displacements relative to the second indexing element, independently of the relative rotational displacement of the first indexing element and the second indexing element.

It may be that the first and second circumferential grooves are arranged to bias the direction of movement of the third indexing element upon linear displacement of the first indexing element and the second indexing element.

It may be that the second circumferential groove is configured to bias movement of the third indexing element in a first direction around the circumference of the first axis. The second circumferential groove may comprise a plurality of first ramp sections in which the engagement element moving in the first direction also moves from a first end of the second indexing element to a second end of the second indexing element; a plurality of second ramp sections, in which the engagement element moving in the first direction also moves from the second end of the second indexing element to the second end of the indexing element; a plurality of first turning points, in which the third indexing element moving in the first direction moves from a first ramp section to a second; and a plurality of second turning points, in which the third indexing element moving in the first direction moves from a second ramp section to a first; and the first circumferential groove comprises a groove at a constant spacing from a first end of the second indexing element.

It may be that relative displacement of the first indexing element and second indexing element causes relative movement of the intersection point.

It may be that the groove comprises an upper edge and a lower edge; and at first turning points, the lower edge follows the upper edge in the first direction and at second turning points, the upper edge follows the lower edge in the first direction, such that the engagement element is biased to move in the first direction.

It may be that the first turning points restrain the relative linear displacement of the first indexing element and the second indexing element, the first turning points being provided at two or more positions along the length of the second indexing element, the two or more positions corresponding to two or more different linear displacement.

It may be that the second turning points restrict the maximum displacement between the first indexing element and the second indexing element.

It may be that the third indexing element is separate from the first and second indexing elements, for example a ball bearing. Alternatively, the third indexing element may be provided by a portion of one of the first and second indexing elements.

It may be that a plurality of third indexing elements is provided, each being provided in a separate intersection point between the first circumferential groove and the second circumferential groove.

It may be that biasing means is provided to bias the first and second indexing element to a first linear displacement.

According to a sixth aspect of the invention there is provided a mixer valve and a dual control unit according to the preceding aspects of the invention, the dual control unit provided at the front end of the mixer valve, the first input device comprising a push button for operating the diaphragm valve, the second input device comprising a rotatable control for controlling the thermostatic cartridge.

BRIEF DESCRIPTION OF THE DRAWINGS

There now follows by way of example only a detailed description of the present invention with reference to the accompanying drawings, in which like reference numerals are used to indicate the same or similar parts throughout and wherein;

FIG. 18 shows a modification to the mixer valve of FIGS. 1 to 4.

DETAILED DESCRIPTION

Figure 1:
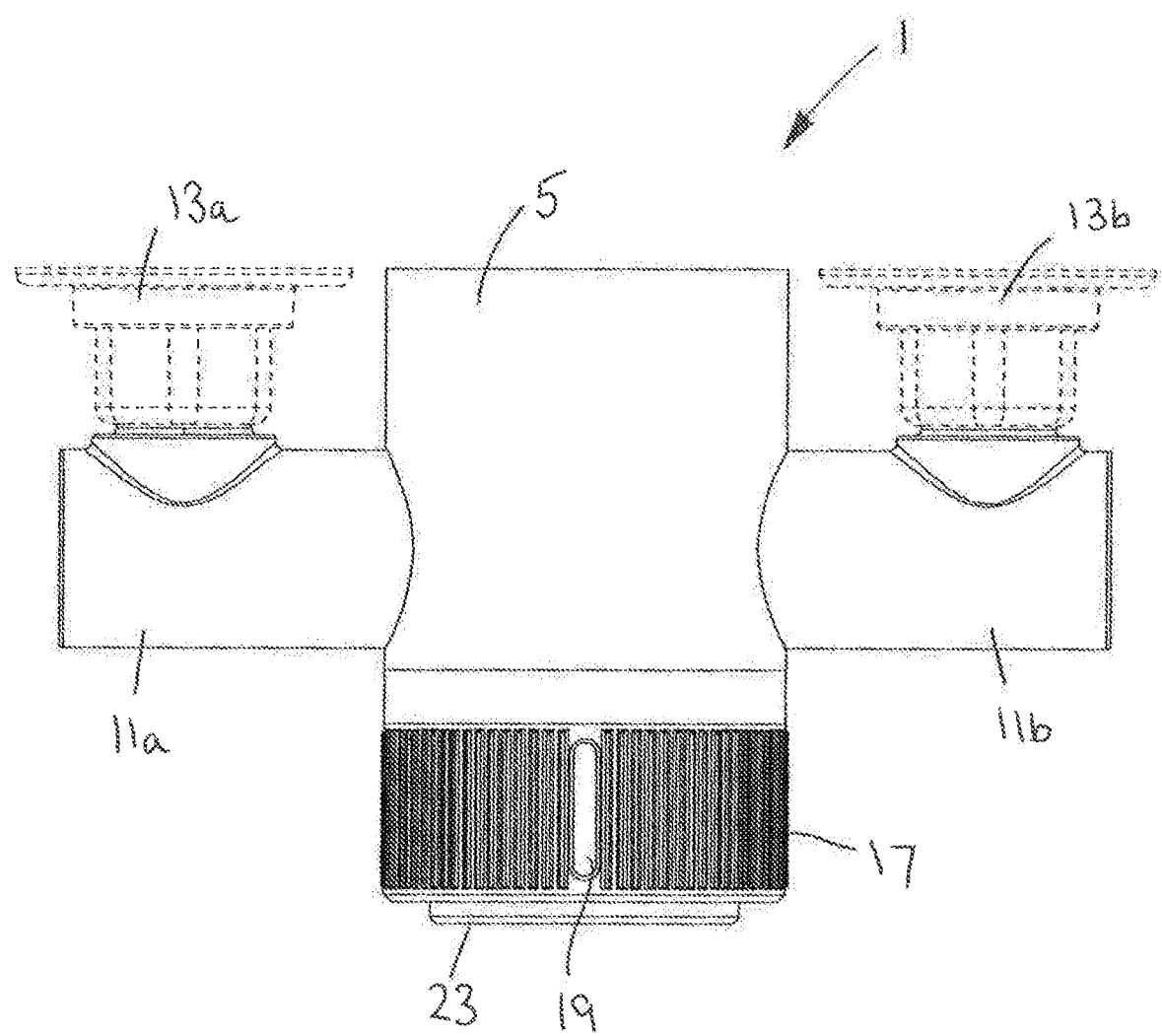
FIG. 1 shows a plan view of a mixer valve of an embodiment of the invention.
Figure 2:
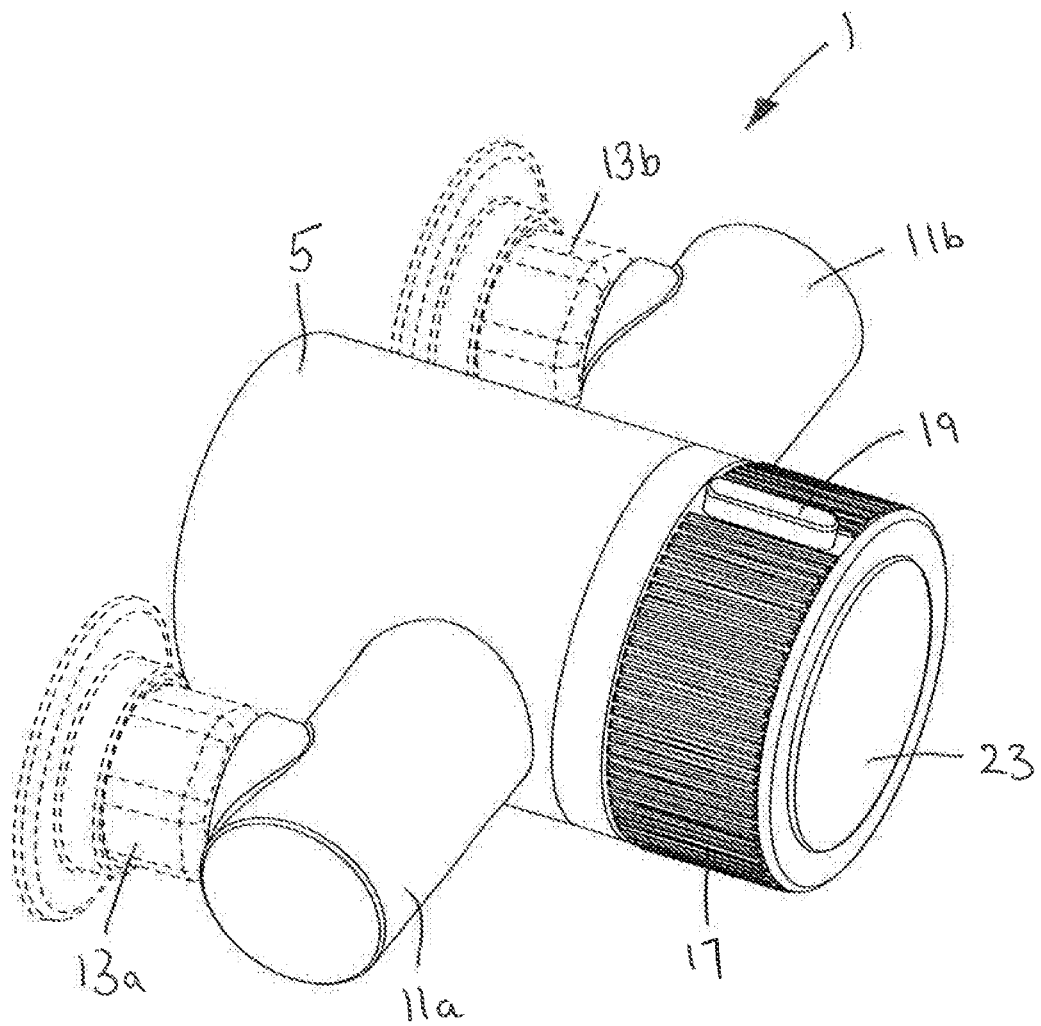
FIG. 2 shows a perspective view of the mixer valve of FIG. 1.
Figure 3:
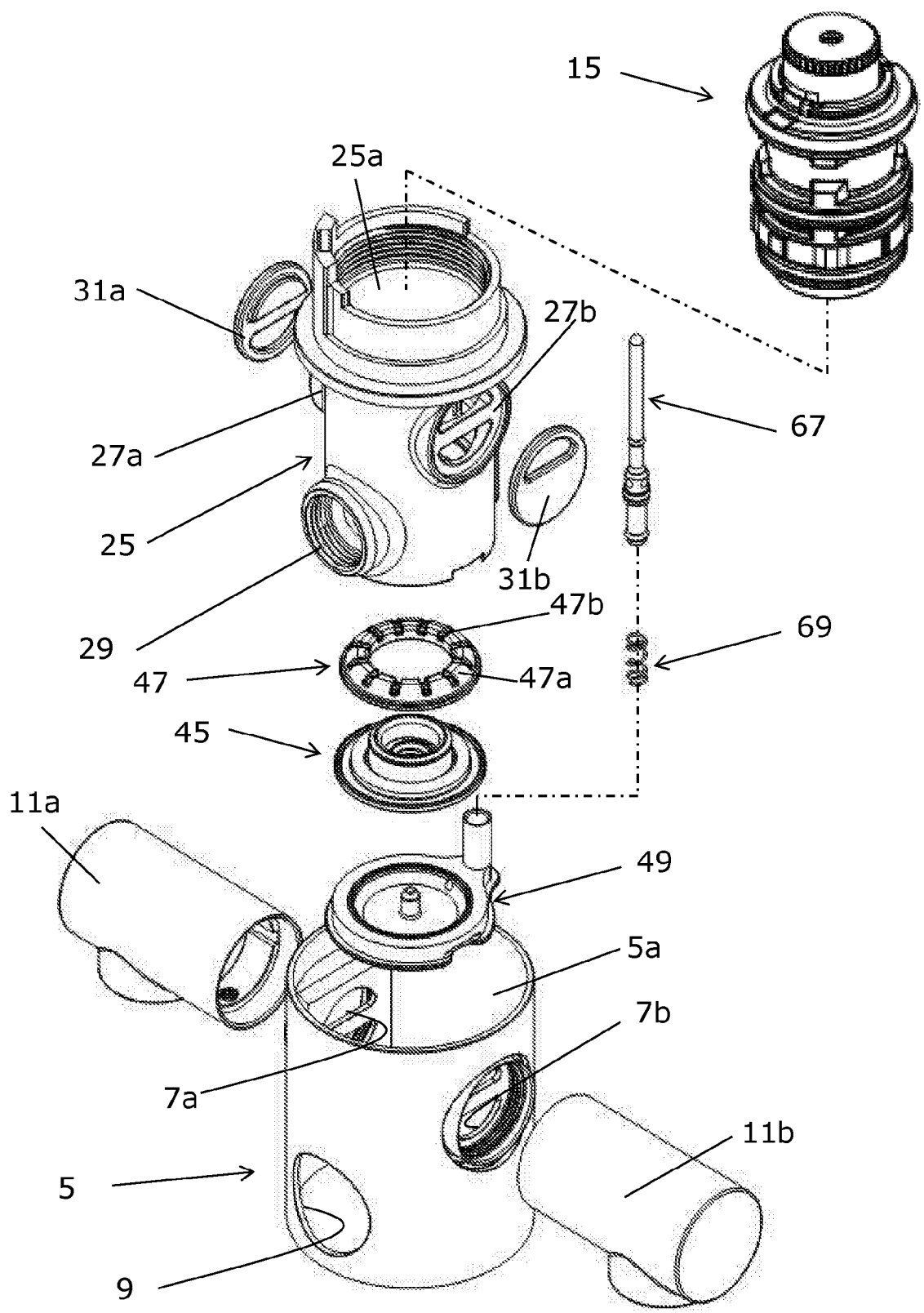
FIG. 3 shows an exploded view of the valve mechanism of the mixer valve of FIGS. 1 and 2.

Referring first to FIGS. 1 to 4 of the accompanying drawings, a mixer valve 1 is shown having a valve assembly 3 for mixing hot and cold water to provide a source of temperature controlled water. The mixer valve 1 has a valve body 5, preferably cylindrical. The valve body 5 defines a volume 5a for receiving the valve assembly 3. The valve body 5 includes two inlets 7a, 7b for hot and cold water and an outlet 9 for mixed water. The inlets 7a, 7b, may be coupled to respective inlet shoulders 11a, 11b, and the inlet shoulders 11a, 11b may be connected to the hot and cold water supplies via fittings 13a, 13b.

The valve assembly 3 includes a thermostatic cartridge 15 for mixing the hot and cold water supplies for controlling mixed water temperature in response to actuation of a rotatable control member 17 and a diaphragm valve 21 for controlling flow of mixed water from the outlet 9 in response to actuation of a push operated control member such as a push button 23. In other embodiments the cartridge 15 may be non-thermostatic. The rotatable control member 17 may include an over-ride button 19 for allowing a user to select an outlet water temperature above a pre-set temperature for example 45 degrees C.

The thermostatic cartridge 15 and diaphragm valve 21 are received in a body 25 received in the valve body 5. The body 25 defines a volume 25a for receiving the cartridge 15 and diaphragm valve 21. In this embodiment, the diaphragm valve 21 is arranged at the inner or rear end of the thermostatic cartridge 15, preferably adjacent to the rear end of the cartridge body 25. In this way, the diaphragm valve 21 is disposed between the thermostatic cartridge and the rear end of the cartridge body 25. In this embodiment, the control member 17 and push button 23 are arranged at the outer or front end of the thermostatic cartridge 15, preferably adjacent to the front end of the cartridge body 25. In this way, the thermostatic cartridge 15 is disposed between the push button 23 and the diaphragm valve 21.

The cartridge body 25 has inlets 27a, 27b and an outlet 29 that align with the inlets 7a, 7b and outlet 9 of the valve body 5. Seals 31a, 31b configure the inlets 27a, 27b of the cartridge body 25 for connection to the hot and cold water supplies and form fluid tight seals between the valve body inlets 7a, 7b and the cartridge body inlets 27a, 27b. In this embodiment, the outlet 29 is configured for connecting the outlet 29 of the cartridge body 25 to a fluid supply line (not shown) such as a hose for a showerhead. For example a nipple (not shown) may be provided with an externally threaded portion at one end that can be inserted through the outlet 9 of the valve body 5 to engage an internally threaded portion 29a of the outlet 29 of the cartridge body 25 so that an externally threaded portion at the other end of the nipple projects from the outlet 9 of body for attaching an internally threaded portion of a hose connector (not shown).

The control member 17 is operable to control the thermostatic cartridge 15 for a user to select the desired outlet temperature of mixed water from the mixer valve 1. The push button 23 is operable to control the diaphragm valve 21 for a user to turn the flow of water on and off. The control member 17 may partly or wholly surround the push button 23. The control member 17 and push button 23 may be configured to be operable independently so that rotation of the control member 17 does not change the position of the push button 23 and pressing the push button 23 does not change the position of the control member 17. In this way, if the push button 23 is provided with information such as text or graphics or a logo on its face, actuation of the rotatable control member 17 does not change the orientation of the information presented to the user on the push button 23.

Seals 33a, 33b, 33c seal the thermostatic cartridge 15 at axially spaced positions within the cartridge body 25. The thermostatic cartridge 15 has an inlet for cold water between the seals 33a, 33b and an inlet for hot water between the seals 33b, 33c. The thermostatic cartridge 15 also has an outlet 35 for mixed water at the inner end. Inlet 27a of the cartridge body 25 is configured to communicate with the hot water inlet of the thermostatic cartridge 15 between the seals 33b, 33c. Inlet 27b of the cartridge body 25 is configured to communicate with the cold water inlet of the thermostatic cartridge 15 between the seals 33a, 33b.

The thermostatic cartridge 15 may be of known type for mixing hot and cold water. For example a shuttle valve (not shown) movable between axially spaced hot and cold seats to control the relative proportions of hot and cold water admitted to a mixing chamber that communicates with the outlet, and a thermostat 37 responsive to the mixed water temperature to adjust the position of the shuttle valve to maintain the user selected mixed water temperature.

The thermostatic cartridge 15 is a push fit in the cartridge body 25 from the front end and the inner end is located by engagement with an internal partition wall 39 spaced from the rear end of the cartridge body 25. The partition wall 39 has a central opening 41 that aligns with the mixed water outlet 35 at the inner end of the thermostatic cartridge 15 and opens to an outlet chamber 43 in communication with the outlet 29 of the cartridge body 25.

The flow of water from the mixed water outlet 35 of the thermostatic cartridge 15 through the opening 41 in the partition wall 39 into the outlet chamber 43 and, from there, to the outlet 29 of the cartridge body 25 is controlled by the diaphragm valve 21. The diaphragm valve 21 includes a diaphragm 45 and a diaphragm support member 47. Marginal edges of the diaphragm 45 and diaphragm support member 47 are clamped between the cartridge body 25 and an end cap 49 secured at the rear end of the cartridge body 25. The diaphragm 45 separates the outlet chamber 43 on one side of the diaphragm 45 from a control chamber 51 on the other side of the diaphragm 45.

The diaphragm 45 may be formed of rubber or other suitable flexible material. In this embodiment, the diaphragm 45 is moulded onto a chassis member 53. In other embodiments, the diaphragm 45 may be fixed to the chassis member 53 by other means such as chemical bonding or mechanical retention. The chassis member 53 may be formed of plastics or other suitable material that is less flexible than the material of the diaphragm 45. The chassis member 53 gives stiffness to the central region of the diaphragm 45. This helps to minimise deformities in the rubber.

The diaphragm 45 has a raised wall portion 45a that extends from the central region of the diaphragm 45 towards the partition wall 39. A portion of the partition wall 39 provides a valve seat 39a extending around the marginal edge of opening 41. In the closed position of the diaphragm valve 21 shown in FIGS. 4 and 5, the upper edge of the wall portion 45a engages the valve seat 39a to isolate the outlet 35 of the thermostatic cartridge 15 from the outlet chamber 43 and prevent the flow of water from the outlet 35 to the outlet 29 of the cartridge body 25. In the open position of the diaphragm valve 21 shown in FIG. 6, the upper edge of the wall portion 45a is spaced from the valve seat 39a to connect the outlet 35 of the thermostatic cartridge 15 to the outlet chamber 43 and allow the flow of water from the outlet 35 to the outlet 29 of the cartridge body 25.

Figure 4:
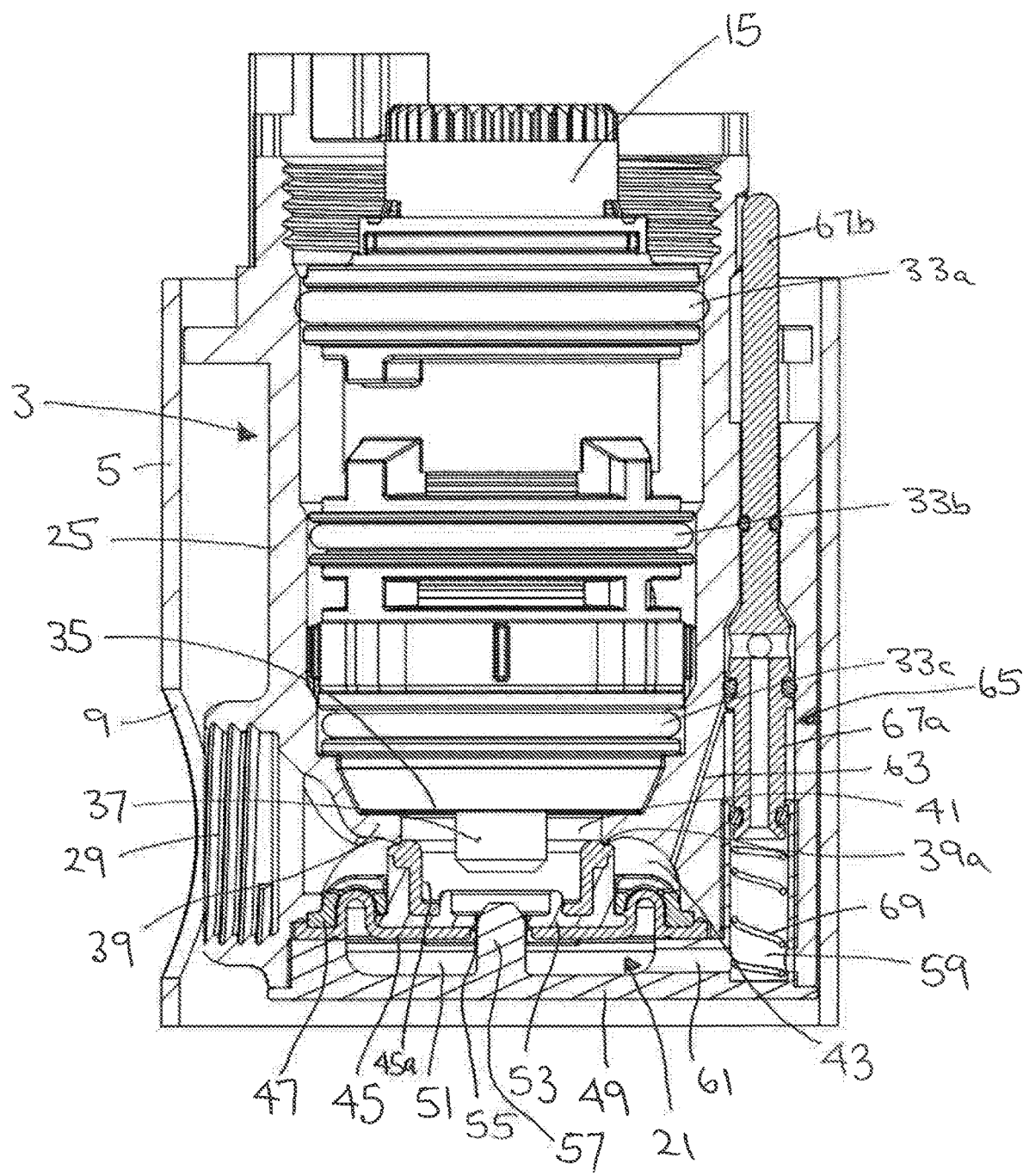
FIG. 4 shows a sectional view of the valve mechanism of FIG. 3, with the diaphragm valve and relief valve in the closed positions.
Figure 5:
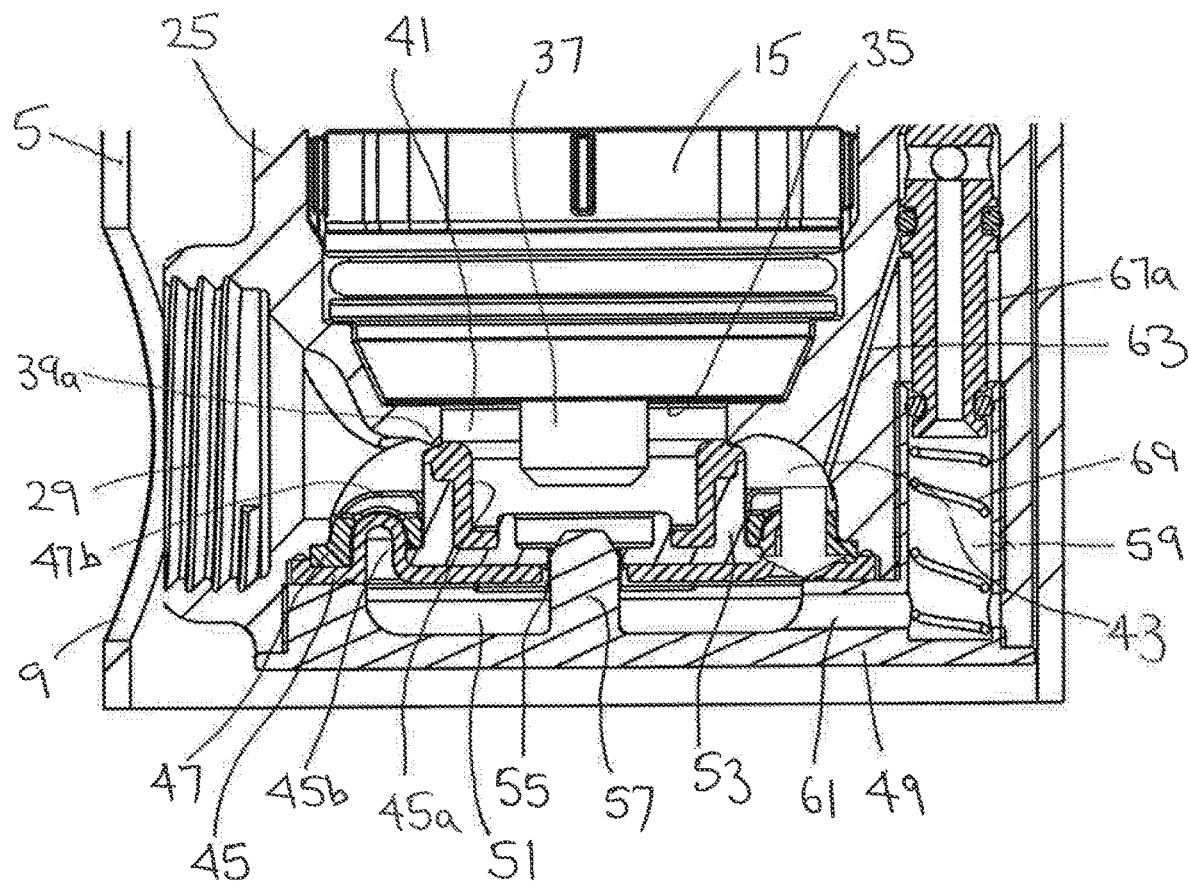
FIG. 5 shows an enlarged sectional view of the diaphragm valve and relief valve in the closed positions.
Figure 6:
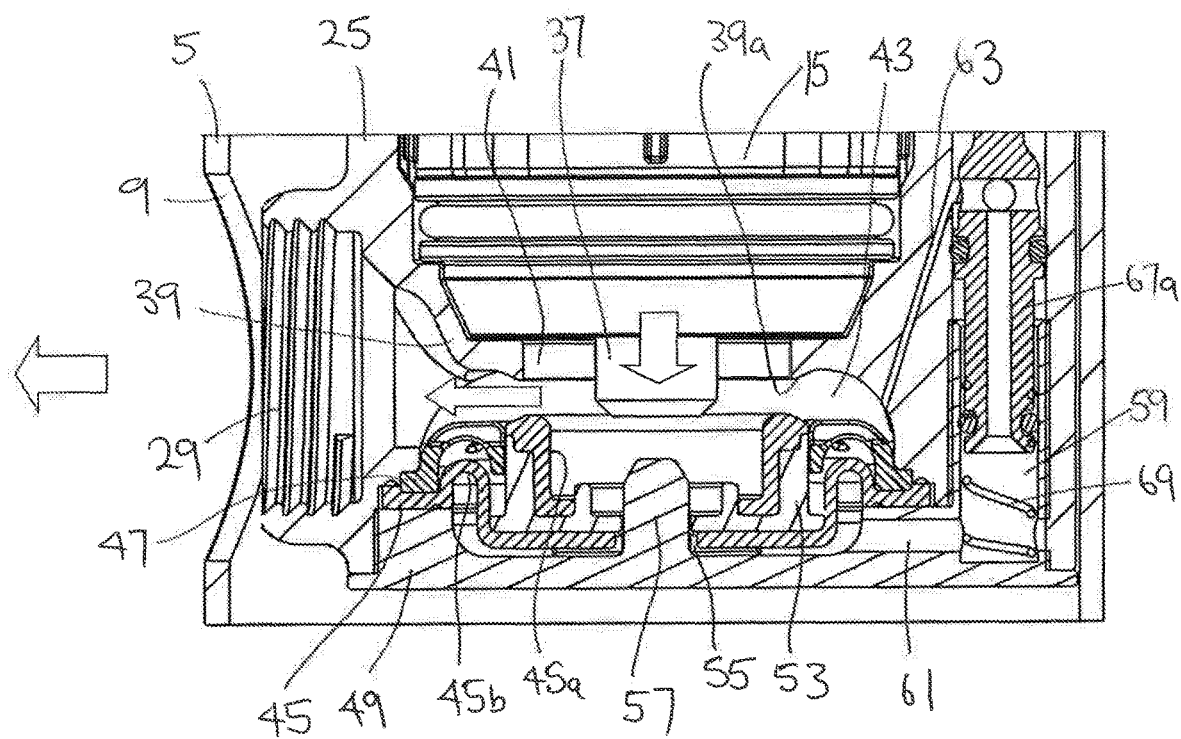
FIG. 6 shows an enlarged sectional view of the diaphragm valve and relief valve in the open positions.

The diaphragm 45 has a rolling edge portion 45b configured for movement of the diaphragm between the closed position shown in FIGS. 4 and 5 and the open position shown in FIG. 6. A portion 47a of the diaphragm support member 47 preferably extends over the rolling edge portion 45b and is provided with one, preferably several, holes 47b. In the closed position of the diaphragm valve 45, the rolling edge portion 45b of the diaphragm 45 seats in the portion 47a in the closed position which prevents the rolling edge portion 45b "ballooning" under the pressure differential across the diaphragm 45.

The diaphragm 45 has a bleed hole 55 that connects the central area of the diaphragm 45 within the wall portion 45a on one side of the diaphragm 45 to the control chamber 51 on the other side of the diaphragm 45. In this embodiment, the end cap 49 has a pin 57 that extends through the bleed hole 55. The pin 57 guides the diaphragm 45 so that movement of the diaphragm 45 between the open and closed positions is substantially linear ensuring a good quality seal is formed in the closed position. The pin 57 may prevent the build-up of calcium deposits that could block the bleed hole 55.

In this embodiment the bleed hole 55 is centrally located but this may not be essential and in some embodiments the bleed hole 55 may be located non-centrally. In other embodiments, the diaphragm 45 may include more than one bleed hole 55. Where more than one bleed hole 55 is provided these may be provided at any location. Where more than one bleed hole 55 is provided, the end cap 49 may be provided with a pin 57 for at least one of the bleed holes 55 and optionally a separate pin 57 for each bleed hole 55. In other embodiments, the pin 57 or pins 57 may be omitted.

A fluid bypass connects the control chamber 51 to the outlet chamber 43 and controls the flow of water from the control chamber 51 to the outlet chamber 43 in response to actuation of the push button 23 to control the pressure differential across the diaphragm 45 for moving the diaphragm 45 between the closed and open positions. The fluid bypass includes a bypass chamber 59 formed in the cartridge body 25 adjacent to the rear end. The control chamber 51 communicates with an inlet of the bypass chamber 59 via a passageway 61 and the outlet chamber 43 communicates with an outlet of the bypass chamber 59 via a passageway 63. The fluid bypass further includes a bypass valve 65 for controlling flow of water from the control chamber 51 through the bypass chamber 59 to the outlet chamber 43.

In this embodiment, the bypass valve 65 comprises a valve member 67 having a head portion 67a received in the bypass chamber 61 and a tail portion 67b that extends from the bypass chamber 61 towards the front end of the cartridge body 25. The valve member 67 is biased to a closed position shown in FIGS. 4 and 5 by a spring 69. In the closed position, the valve member 67 isolates the control chamber 51 from the outlet chamber 43.

The valve member 67 is movable to an open position shown in FIG. 6 against the biasing of the spring 69 when the push button 23 is pressed. In the open position the valve member 67 connects the control chamber 51 to the outlet chamber 43. The valve member 67 is held in the open position against the biasing of the spring 69 until the push button 23 is pressed again allowing the valve member 67 to return to the closed position under the biasing of the spring 69.

To assemble the valve assembly 3, the diaphragm 45, diaphragm support 47, valve member 67 and spring 69 are inserted into the cartridge body 25 from the bottom or rear end. The end cap 27 is then permanently connected and sealed to the rear end of the cartridge body 25. The thermostatic cartridge 15 is then inserted into the cartridge body 25 from the front end and secured in place. The valve assembly 3 may then be installed into the inner volume 5a of the valve body 5 with a rear end of the cartridge body 25 at or adjacent to the rear end of the valve body 5 and a control unit including the control member 17 and push button 23 may be provided at the front end of the valve body 5 for user actuation of the thermostatic cartridge 15 and diaphragm valve 21. The assembled valve assembly 3 comprising the thermostatic cartridge 15 and diaphragm valve 21 received within the cartridge body 25 can be installed in any suitably sized valve body 5 which has inlets 7a, 7b and outlets 9 aligned with the inlets 27a, 27b, and outlets 29 of the cartridge body 25.

Figure 7:
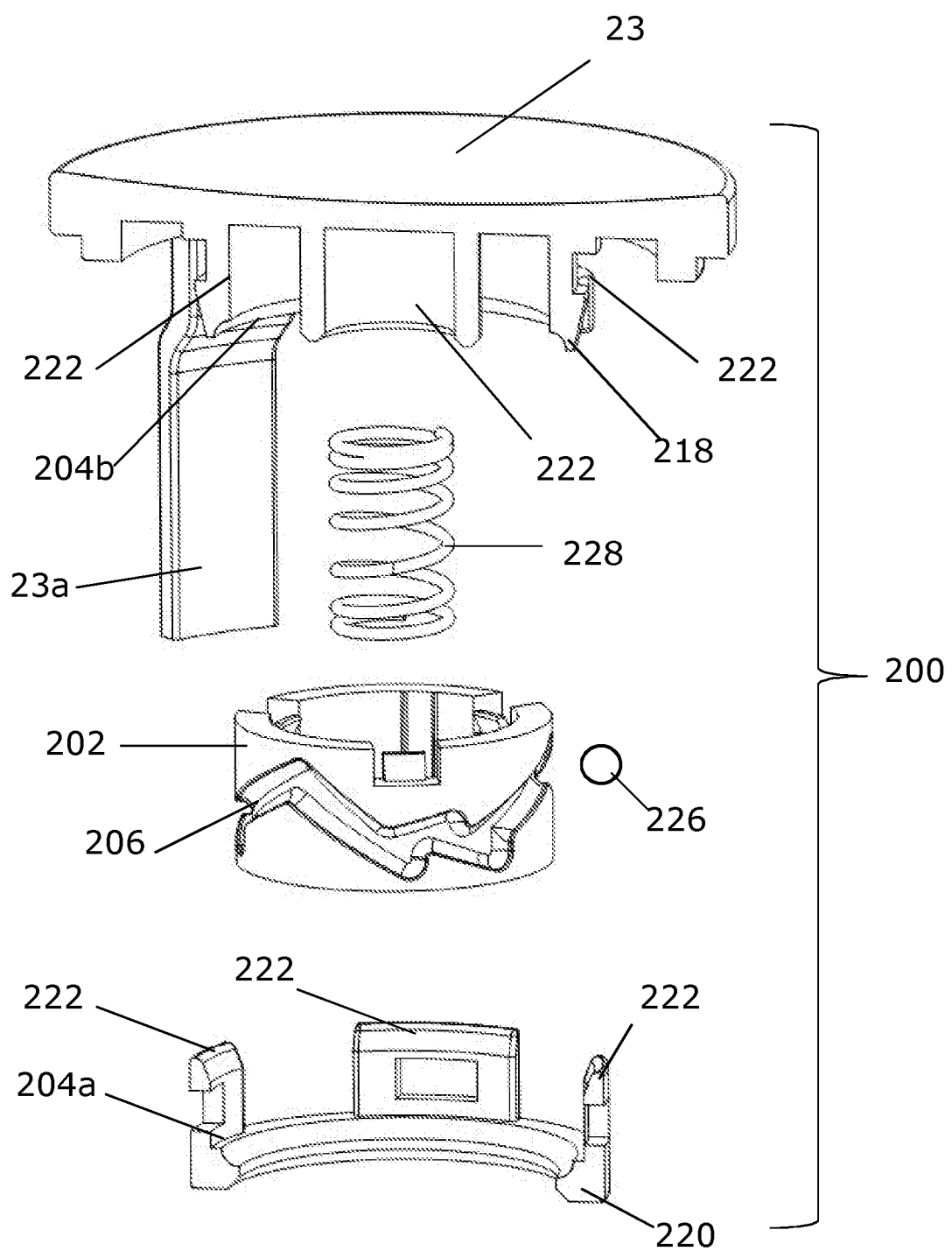
FIG. 7 shows an exploded sectional view of an embodiment of an indexing mechanism for the push button.
Figure 8:
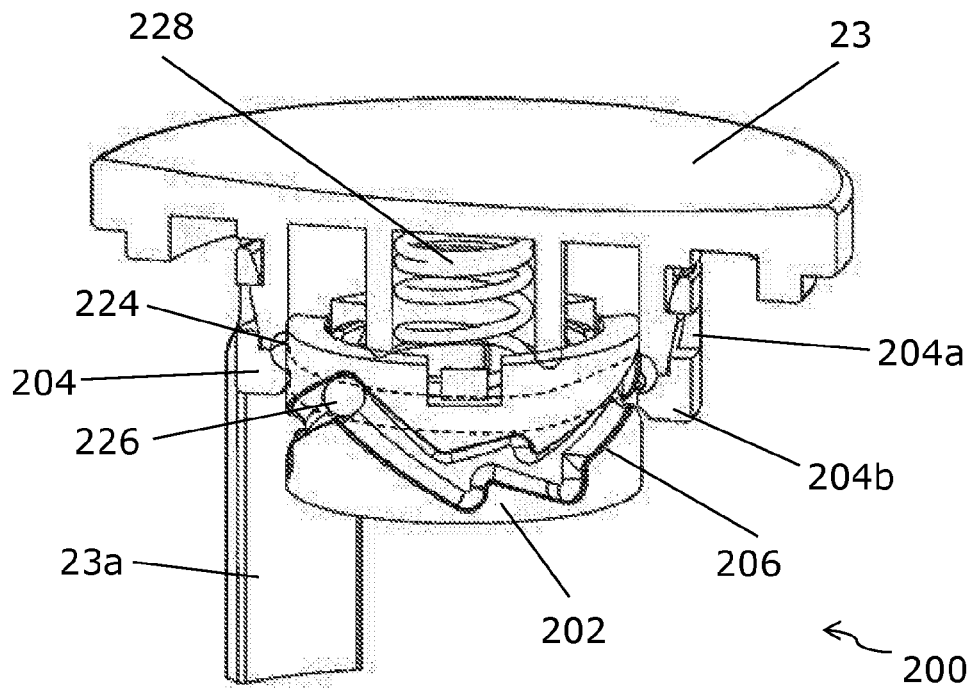
FIG. 8 shows a partial sectional view of the indexing mechanism of FIG. 7.

Referring now to FIGS. 7 and 8, an indexing mechanism for the push button 23 is shown. The button 23 has an outer or first position in which the diaphragm valve 21 is closed and an inner or second position in which the diaphragm valve 21 is open. In other embodiments, the outer or first position may correspond to the open position of the diaphragm valve 21 and the inner or second position may correspond to the open position of the diaphragm valve 21.

The indexing mechanism controls movement of the button 23 between the first and second positions and locates the button 23 in each position so that each time the button 23 is pressed it moves from one position to the other position and remains at the other position until the next time the button 23 is pressed. This provides the user with a visual indicator of the position of the button 23 and feedback on the status of the valve assembly 3.

The indexing mechanism has a central element 202 and an outer element 204. The central element 202 has a cylindrical wall with a first track 206 recessed into the outer surface around its circumference. The first track 206 follows a generally zig-zag path in the circumferential direction described in more detail later with reference to FIGS. 9 to 11. The outer element 204 has a cylindrical wall with a second track 224 recessed into the inner surface around its circumference. The second track 224 follows a linear or straight path in the circumferential direction. The first and second tracks 206, 224 are preferably continuous in the circumferential direction.

The outer element 204 is formed from a lower part 204a and an upper part 204b. The upper part 204b is formed integral with the push button 23. The upper and lower parts can be joined together by interlocking projections 222 and are cut away such that the second track 224 is formed when the parts 204a, 204b are joined together. In some embodiments, the button 23 need not be formed with the outer element 204 and may be separately coupled. The outer element 204 may also be formed of a single piece rather than two pieces 204a, 204b. In some embodiments, the button 23 may be coupled to the central element 202 rather than the outer element 204 and either the central element 202 or the outer element 204 may be provided with the track following a zig-zag path with the other element provided with the track following a linear or straight path.

When the indexing mechanism is assembled, the central element 202 is arranged concentrically inside the outer element 204, with the first track 206 and the second track 224 facing each other and forming an enclosed path in which a ball bearing 226 is trapped where the two tracks 206, 224 intersect. In some embodiments more than one ball bearing 226 may be provided at spaced intervals around the tracks. This may improve the operation of the dual control 200. It will also be appreciated that in place of ball bearings 226, any suitable rotating structure could be used.

The trapped ball bearing 226 is confined to move around the zig-zag path and limits the extent to which the elements 202, 204 can move relative to each other along a central axis when the push button 23 is pressed. The trapped ball bearing is also confined to move around the linear or straight path and allows the elements 202, 204 to move relative to each other around the central axis.

In particular, the outer element 204 is able to move up and down relative to the inner element 202 along the central axis when the push button 23 is pressed for axial movement between the first and second positions. The inner element 202 can rotate about the central axis relative to the outer element 204.

A spring 228 is provided that acts between the central element 202 and outer element 204 to urge the push button 23 towards the first position. The push button 23 includes an actuator element 23a that extends from the underside and co-operates with the tail portion 67b of the valve member 67.

Figure 9:
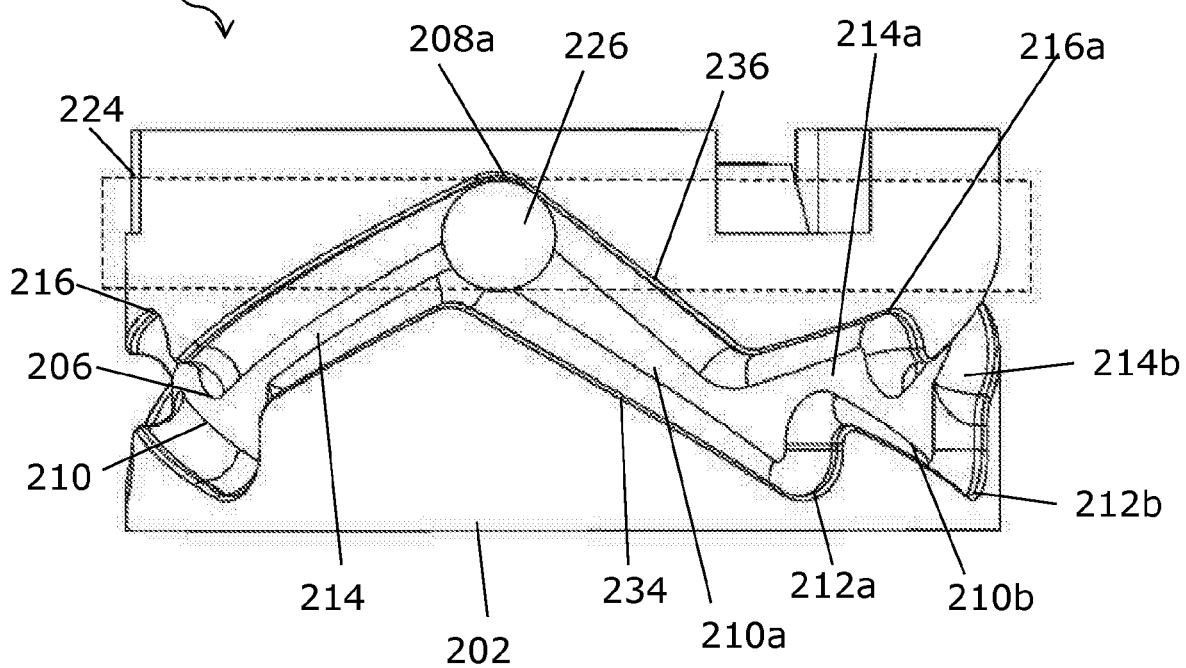
FIG. 9 shows a schematic view of the indexing mechanism of FIG. 7.
Figure 10:
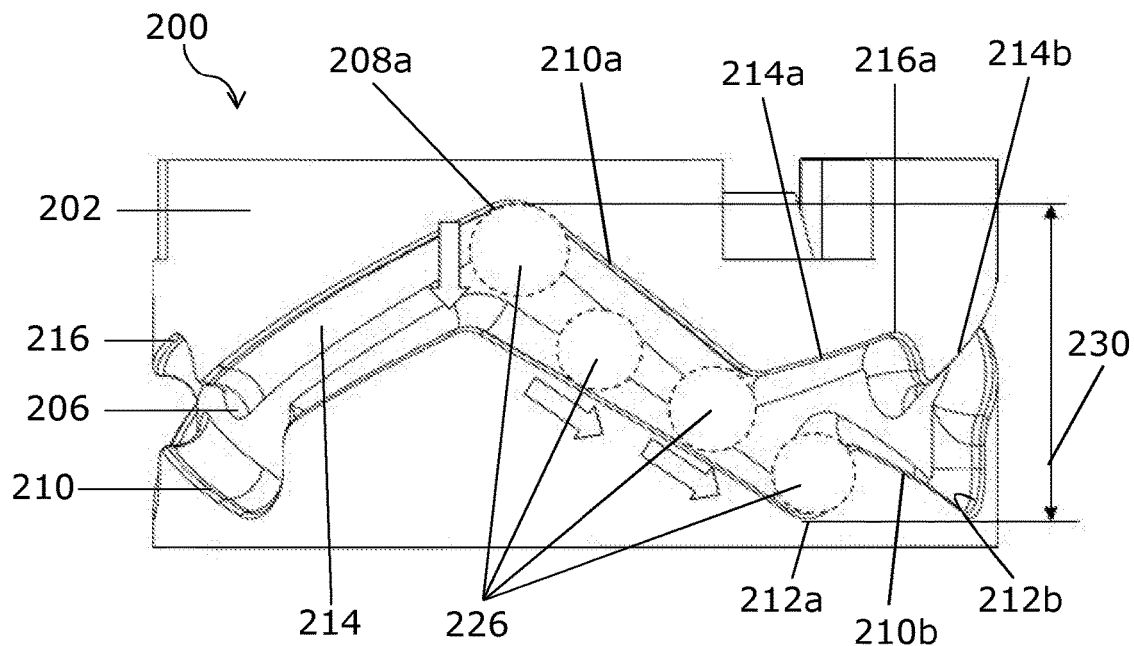
FIG. 10 shows a schematic view of the indexing mechanism during actuation of the push button.
Figure 11:
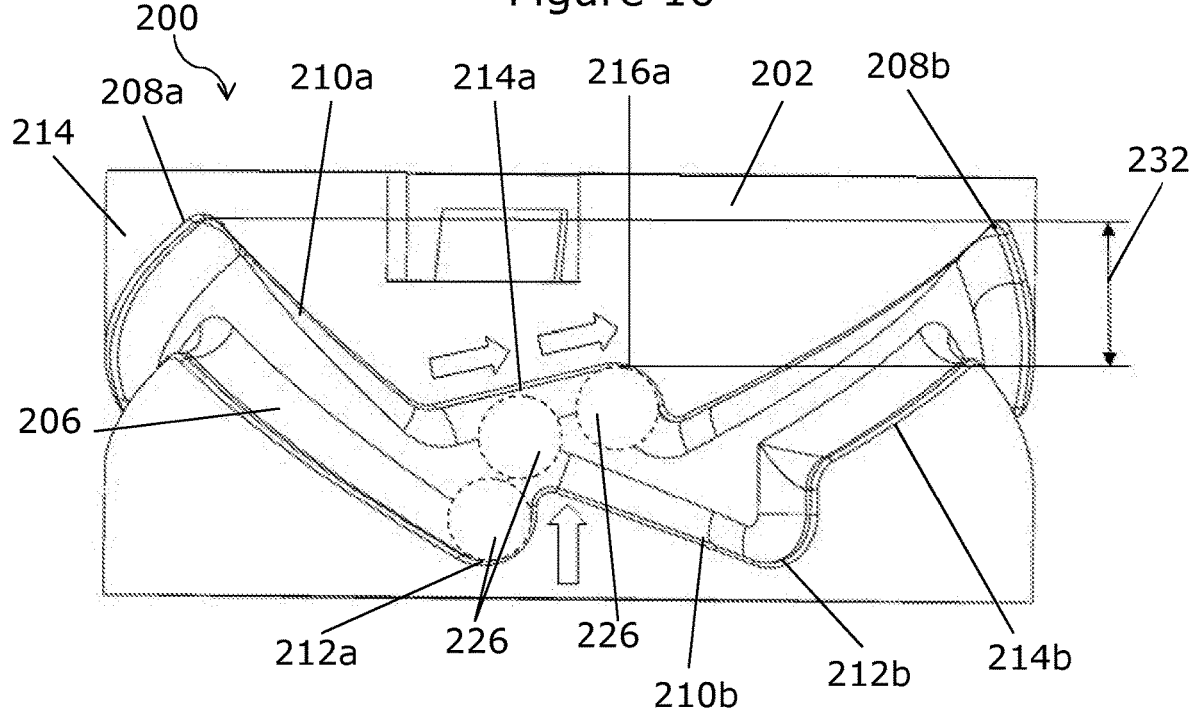
FIG. 11 shows a schematic view of the indexing mechanism after release of the push button.

Referring also to FIGS. 9 to 11, the first track 206 (in an anticlockwise direction) has a downward ramp section 210a between a first major peak 208a and a first low trough 212a. The first track 206 then follows a first upward ramp 214a between the first low point 212a and a first minor peak 216a. The vertical spacing between the first major peak 208a and the first low trough 212a is more than the vertical spacing between the first minor peak 208a and the first low trough 212a.

From the first minor peak 216a, the track follows a second downward ramp 210b to a second low trough 212b and then a second upward ramp 214b to a second major peak 208b. The first track 206 repeats around the circumference of the central element 202, such that it is continuous. In the example shown, the major peaks 208a are all at the same height to one another, the minor peaks 216a are all at the same height to one another and the low troughs 212a are all at the same height to one another.

As can be seen in, for example, FIG. 9, at the major peaks 208a, the lower edge 234 and upper edge 236 of the first track 206 are not aligned along the central axis. Similarly, at the low troughs 212, the lower edge 234 and upper edge 236 are also not aligned along the central axis. Similarly at the minor peaks 216a, the lower edge 234 and upper edge 236 are also not aligned along the central axis.

At the major peaks 208a and at the minor peaks 216a, the high point in the upper edge 236 is ahead of the high point in the lower edge 234 in the anti-clockwise direction (from left to right as viewed in FIG. 9). Conversely, at the low troughs 212a, the low point in the lower edge 234 is ahead of the low point in the upper edge 236 in the anti-clock wise direction (from left to right as viewed in FIG. 9). Also, the leading side of the low trough 212a is a near vertical step on the lower edge 234 and the leading side of the minor peaks 216a is a near vertical step in the upper edge 236.

This arrangement of the peaks and troughs biases the ball bearing 226 to move in the anticlockwise direction around the first track (from left to right as viewed in FIG. 9). The stroke 230 of the button 23 (i.e. the total distance the button 23 can move in the direction of the central axis) is defined by the total vertical movement of the bearing 226 and corresponds to the vertical distance between the apex of the major peaks 208a and the apex of the low troughs 212a.

FIG. 9 shows the ball bearing 226 located at a first major peak 208a. This corresponds to the first position of the push button 23 in which the diaphragm valve 21 and relief valve are closed and the push button 23 is located in this position under the biasing of the spring 228. From the first major peak 208a, the ball bearing 226 is confined to move down the ramp section 210a towards the first low trough 212a as shown in FIG. 10 until it reaches the low trough 212a when the button 23 is pushed against the biasing of the spring 228. This defines the limit of axial movement of the push button 23 in the direction of the central axis.

This movement is transmitted to the valve member 67 and is sufficient to open the bypass valve 65 causing the diaphragm valve 21 to open. From the first low trough 212a, the ball bearing 226 is confined to move up the ramp section 214a toward the first minor peak 216a as shown in FIG. 11 until it reaches the first minor peak 216a under the biasing of the spring 228 acting on the button 23 when the button 23 is released. The biasing of the spring 228 is insufficient to dislodge the ball bearing 226 from the first minor peak 216a and the push button 23 is retained in a depressed condition.

This movement is insufficient to allow the valve member 67 to move to close the bypass valve 65 and the diaphragm valve 21 remains open while the ball bearing 226 is retained at the first minor peak. This corresponds to the second position of the push button 23 in which the diaphragm valve 21 and bypass valve 65 are open. Since the minor peak 216a is lower than the major peak 208a, the button 23 the second position is displaced along the central axis from the first position providing a visual indication that the button 23 has been pressed.

From the first minor peak 216a, the ball bearing 226 is confined to move down the ramp section 210b toward the second low trough 212b until it reaches the second low trough 212b when the button 23 is next pushed against the biasing of the spring 228. From the first low trough 212a, the ball bearing 226 is confined to move up the ramp section 214b toward the second major peak 208a until it reaches the second major peak 208a under the biasing of the spring 228 acting on the button 23 when the button 23 is released.

This movement is sufficient to allow the valve member 67 to move to close the bypass valve 65 causing the diaphragm valve 21 to close. Since the first track 206 repeats around the central element 202, the button 23 can be operated to alternately open and close the diaphragm valve 21 each time the button 23 is pressed.

The vertical and horizontal extent of the ramp sections 210, 214 may be adjusted to change the range of movement of the button 23.

The operation of the valve assembly 3 will now be described starting from the closed positions of the diaphragm valve 21 and bypass valve 65 shown in FIGS. 4 and 5. In the closed positions of the diaphragm valve 21 and bypass valve 65, the wall portion 45a of the diaphragm 45 engages the valve seat 39a preventing flow of water from the cartridge outlet 35 to the outlet 29 of the cartridge body 25, and the valve member 67 prevents flow of water from the control chamber 51 to the outlet chamber 43. As a result, the central area within the wall portion 45a on the top side of the diaphragm 45 and the underside of the diaphragm 45 are exposed to the inlet pressure. The area of the diaphragm 45 exposed to the inlet pressure on the underside is greater than the area on the topside and thus the pressure differential across the diaphragm 45 acts to hold the diaphragm 45 against the valve seat to maintain the diaphragm valve 21 in the closed position.

The valve member 67 is moved to open the bypass valve 65 to allow the flow of water from the control chamber 51 through the fluid bypass to the outlet chamber 43 when the push button 23 is actuated to move from the first position to the second position as described previously. Opening the bypass valve 65 causes the pressure in the control chamber 51 on the underside of the diaphragm 45 to reduce as water flows from the control chamber 51 through the bypass chamber 59 to the outlet chamber 43 more quickly than it is replaced by flow of water through the bleed hole 55 until the underside of the diaphragm 45 is exposed to outlet pressure and the central area on the topside of diaphragm 45 within the wall portion 45a is exposed to inlet pressure. The inlet pressure is greater than the outlet pressure and thus the pressure differential across the diaphragm 45 is reversed and the diaphragm 45 is pushed downward opening the diaphragm valve 21. Opening the diaphragm valve 21 allows water to flow from the thermostatic cartridge outlet 35 through the opening 41 in the partition wall 39 into the outlet chamber 43 and to the outlet 29 of the cartridge body 25 connected to the water delivery line. When the actuating force is removed, the push button 23 is retained in the inner or second position against the biasing of the spring 228 by the indexing mechanism and holds the valve member 67 in the open position against the biasing of the spring 69 so that the fluid bypass remains open and the underside of the diaphragm 45 remains exposed to outlet pressure maintaining the pressure differential keeping the diaphragm valve 21 open.

The valve member 67 is moved to close the bypass valve 65 to prevent the flow of water from the control chamber 51 through the fluid bypass to the outlet chamber 43 when the push button 23 is next actuated to move from the second position to the first position when the actuating force is removed as described previously. Closing the bypass valve 65 causes the pressure in the control chamber 51 on the underside of the diaphragm 45 to increase as water flows through the bleed hole 55 in the diaphragm 45 until the underside of the diaphragm 45 and the central area within the wall portion 47 on the top side of the diaphragm 45 are exposed to the inlet pressure. The area exposed to the inlet pressure on the underside is greater than the area on the topside and thus the pressure differential across the diaphragm 45 is reversed and the diaphragm 45 is pushed upward closing the diaphragm valve 21. Closing the diaphragm valve 21 prevents flow of water from the thermostatic cartridge outlet 35 through the opening 41 in the partition wall 39 into the outlet chamber 43 and to the outlet 29 of the cartridge body 25 connected to the water delivery line. When the actuating force is removed, the push button 23 returns to the outer or first position under the biasing of the spring 228 and is located in this position by the indexing mechanism allowing the valve member 67 to move to the closed position under the biasing of the spring 69 so that the fluid bypass remains closed and the underside of the diaphragm 45 remains exposed to the inlet pressure maintaining the pressure differential keeping the diaphragm valve 21 closed. A spring (not shown) may be provided that acts on the underside of the button at a position offset from the centre of the button and preferably diametrically opposite the actuator element 23a. The offset spring may counteract any tendency for the button 23 to tilt due to the biasing of the valve member 67 acting on the actuator element 23a.

Figure 12:
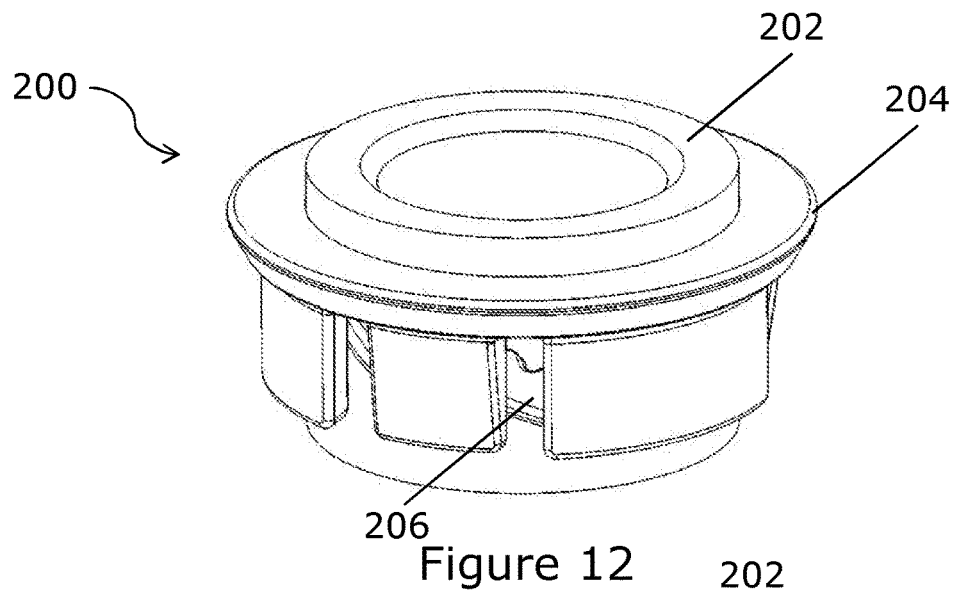
FIG. 12 shows a perspective view of an alternative indexing mechanism.
Figure 13:
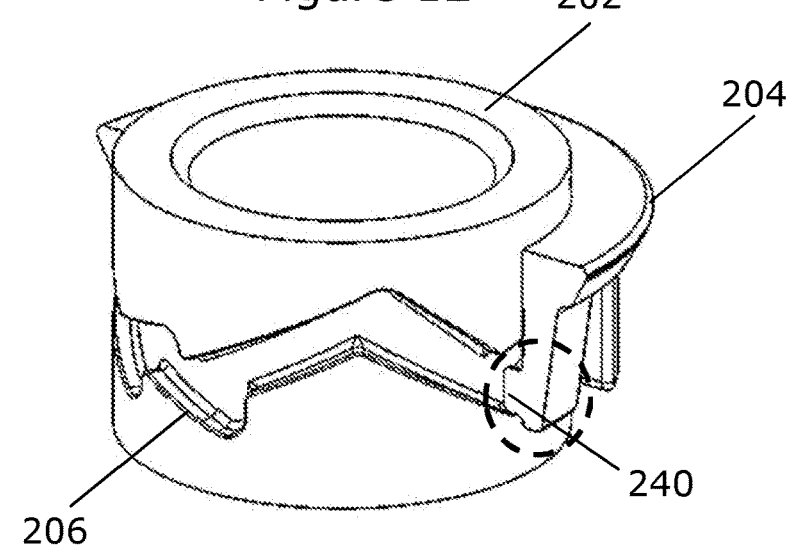
FIG. 13 shows a cut-away view of the indexing mechanism of FIG. 12.
Figure 14:
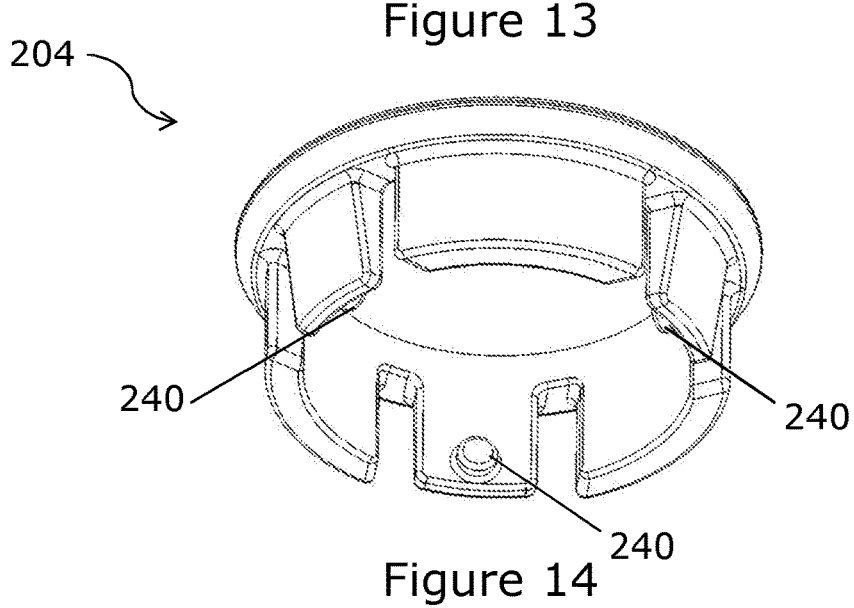
FIG. 14 shows a perspective view of the outer member of the indexing mechanism of FIG. 12.

FIGS. 12, 13 and 14 show a modification to the indexing mechanism in which the ball bearing 226 is replaced by a formation such as a lug 240 on the inner surface of the outer element 204 that engages the zig-zag track 206 on the outer surface of the inner element 202. In this embodiment, three lugs 240 are provided uniformly spaced apart in the circumferential direction. In other embodiments there may be more than three lugs or less than three lugs. One lug may be considered the minimum. The risk of the indexing mechanism jamming may be reduced by the use of one or more lugs integral with the outer element. In other embodiments, the zig-zag track 206 may be on the outer element 204 and the lug or lugs on the inner element 202.

Figure 15:
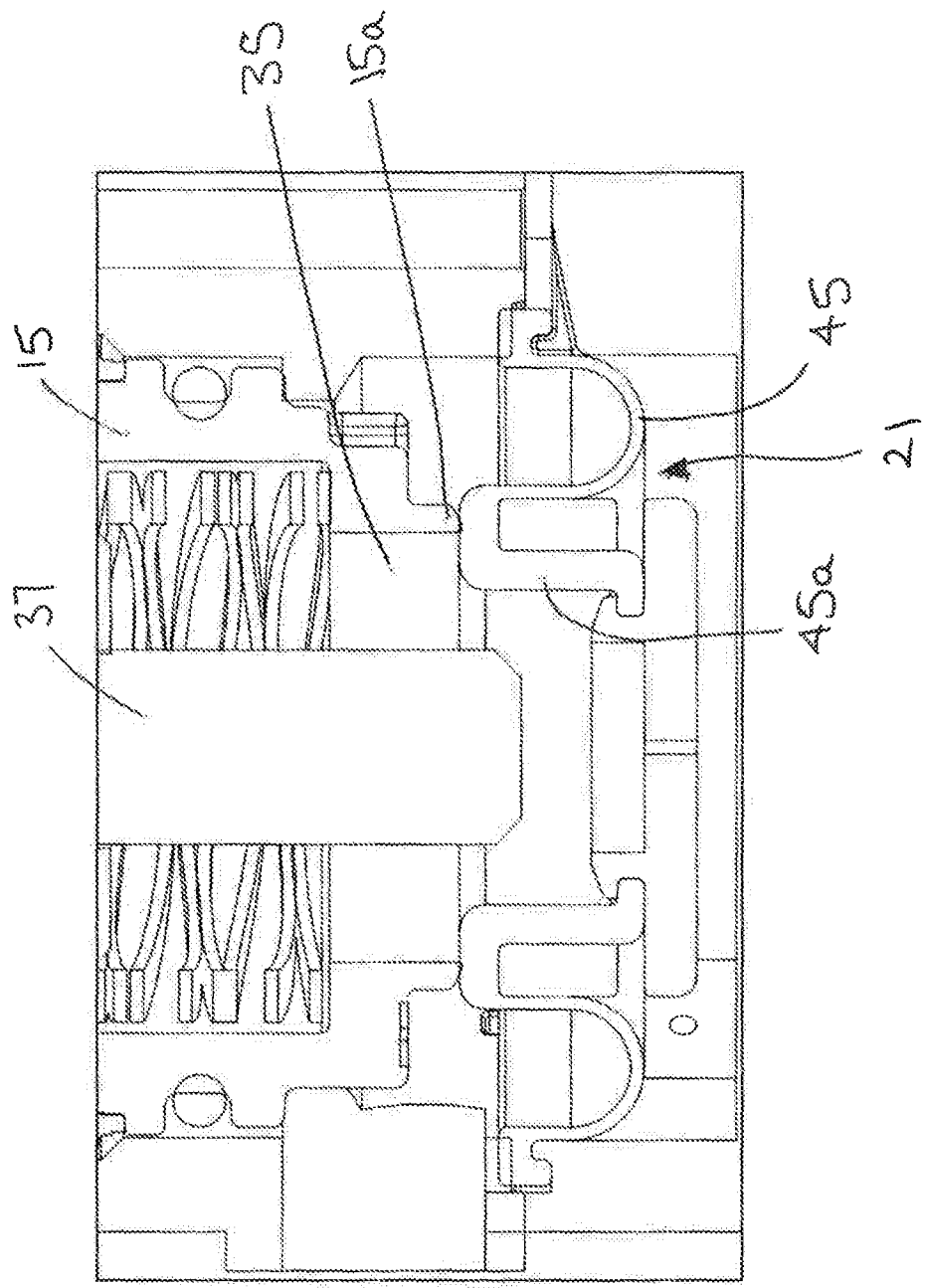
FIG. 15 shows a sectional view of a modification to the valve mechanism shown in FIG. 4.

FIG. 15 shows a modification to the valve assembly 3 in which the valve seat for the diaphragm 45 is formed by the marginal edge 15a of the outlet 35 of the thermostatic cartridge 15.

Figure 16:
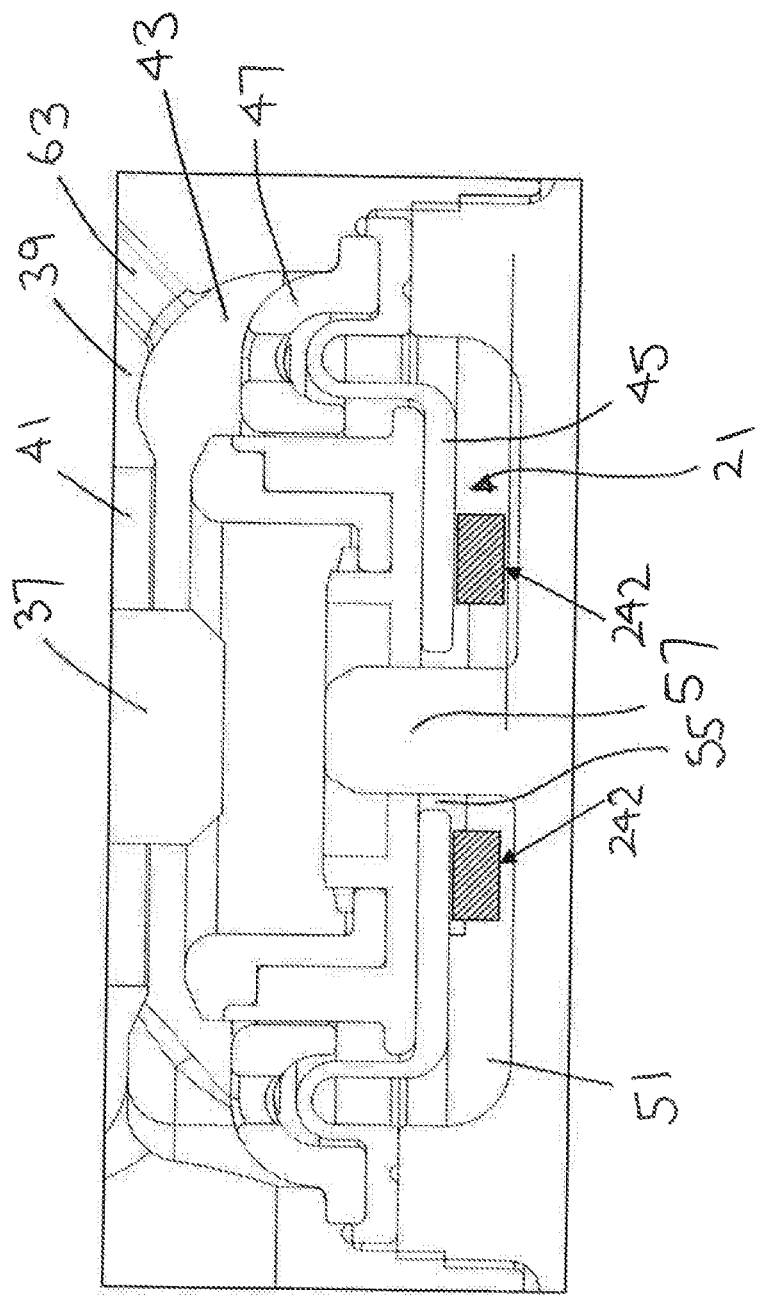
FIG. 16 shows a modification of the diaphragm valve shown in FIGS. 5 and 6.

FIG. 16 shows a modification to the valve assembly 3 for controlling flow. The total amount of travel of the diaphragm 45 away from the closed position is limited by a device 242 arranged below the diaphragm 45. The device 242 may be adjustable. The device 242 may be responsive to inlet pressure to adjust the total amount of travel of the diaphragm 45 away from the closed position. In this way flow rate may be unaffected by changes in the water supply pressures. Where provided, the device 242 is preferably configured to maintain a fluid path between the bleed hole 53 and the inlet of the bypass chamber 59.

Figure 17:
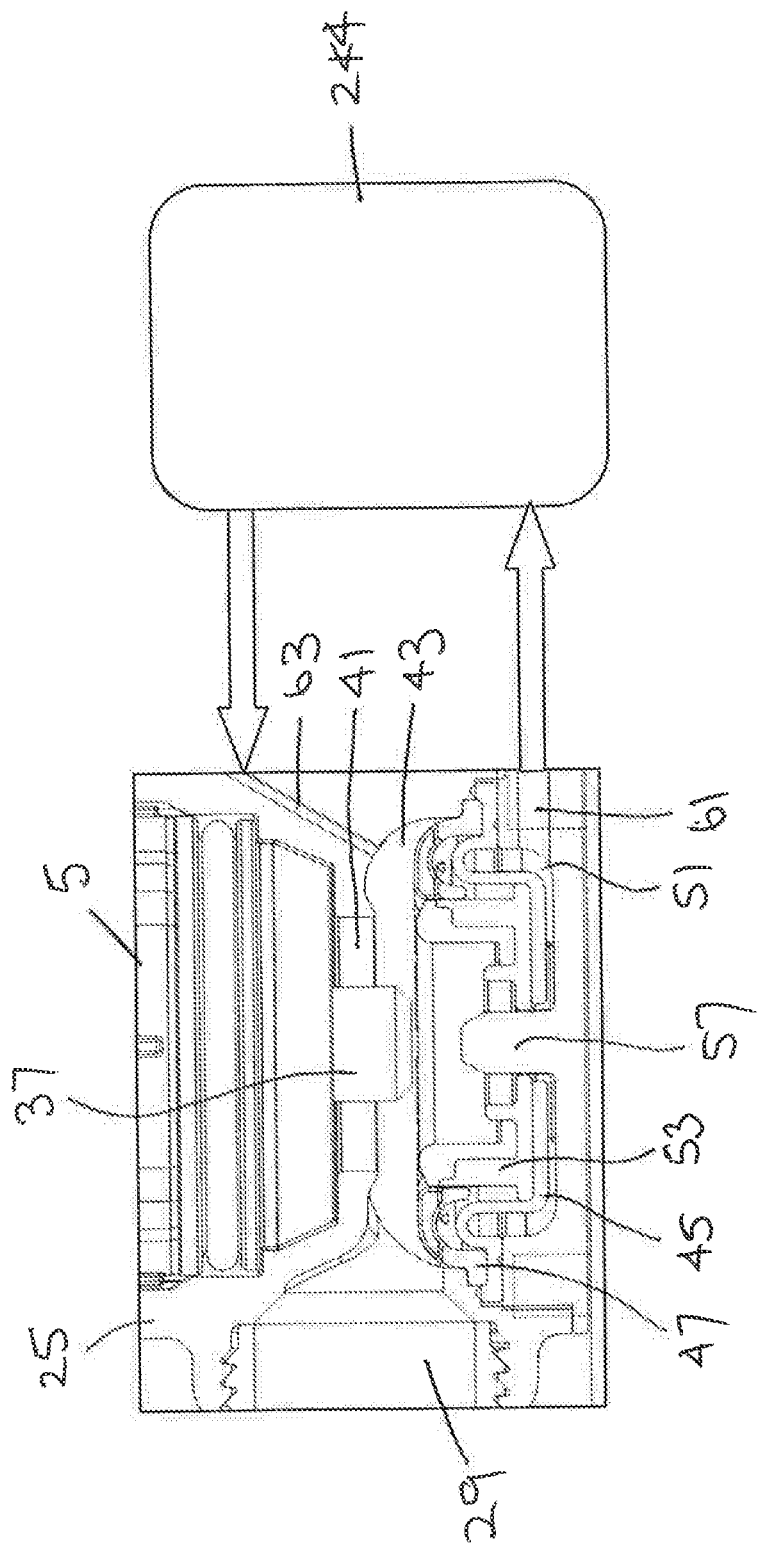
FIG. 17 shows a modification to the mixer valve of FIGS. 1 to 4.

FIG. 17 shows a modification to the mixer valve for remote operation. The pressure differential across the diaphragm 45 of the diaphragm valve 21 is controlled by a device 244 located separately from the valve. In this way the diaphragm valve 21 can be operated remotely. The device 244 may be operated by a push button or by any other suitable means including, but not limited to, mechanically operated means, electrically operated means.

FIG. 18 shows a modification to the mixer valve for controlling pressure within the cartridge body 25. A device 246 responsive to fluid pressure is provided to open when the fluid pressure reaches a pre-determined level to vent the pressure and protect the housing from a critical pressure. The device 246 may include a sealing element 248 biased to a closed position by a calibrated spring 250 that is overcome when fluid pressure acting on the sealing element reaches the pre-determined value to release the pressure within the cartridge body 25. The device 246 may be incorporated into the valve or separate therefrom. The device 246 may also be employed to control the bypass and therefore control opening and closing of the diaphragm valve 21.

Other possible modifications that can be made include:
Phasing the opening and closing action of the diaphragm to prevent water hammer by controlling flow through the bypass for example by calibrating the size of the inlet to and outlet from the bypass chamber.
Strengthening the diaphragm by means such as fabric backed mouldings, dual hardness rubber mouldings in place of or in addition to the support chassis.
Use of ceramics or rubber faced pistons for controlling flow through the bypass.
Damping the diaphragm movement to reduce the velocity of movement at high pressure.
Integrating filtration into the diaphragm plate directly or into the surrounding components.

Additional benefits of the invention include:
The thermostatic cartridge can be serviced independently from the shut-off element.
The thermostatic cartridge can be upgraded as newer technologies become available.

In the context of the current application, the invention has been described for use in applications with water. However, it may be used to control the flow of any fluid. The invention is also not limited to use in mixer valves and may be used in any suitable devices, such as taps.

In the context of the current application, the dual control 200 is described for use with a mixer valve 1, where the push button 23 controls whether the flow is on or off and the rotatable control 17 varies shower temperature. It will be appreciated that the mechanism 200 may be used in any situation where independent rotation of two controls is desired.

It will be understood that the invention is not limited to the embodiment described herein and that features of the valve or dual control may be altered, omitted or adapted according to the requirements of the valve or mechanism. It will also be understood that the invention includes any novel feature described herein as well as combinations and sub-combinations of any of the features and equivalents thereof.

The invention claimed is:

1. A mixer valve comprising a body extending in a first direction between a front end and a rear end, the body defining a volume, and a thermostatic cartridge received in the volume, wherein the thermostatic cartridge is provided with an outlet at the rear end of the body, wherein the mixer valve further comprises a diaphragm valve received in the volume, the diaphragm valve provided at the outlet of the thermostatic cartridge, between the thermostatic cartridge and the rear end of the body, and wherein the diaphragm valve is operable in response to actuation of a push button provided at the front end of the body, to control flow of water from the mixer valve.

2. The mixer valve of claim 1 wherein the diaphragm valve comprises a diaphragm movable towards and away from the outlet of the thermostatic cartridge in response to a pressure differential across the diaphragm.

3. The mixer valve of claim 2, wherein the diaphragm engages with a valve seat to close the outlet of thermostatic cartridge to prevent flow of water from the outlet of the thermostatic cartridge to the mixer valve outlet, and wherein the diaphragm disengages from the valve seat to open the outlet of the thermostatic cartridge to allow flow of water from the outlet of the thermostatic cartridge to the mixer valve outlet.

4. The mixer valve of claim 3, further comprising a device arranged below the diaphragm to limit the travel of the diaphragm away from the valve seat when opening the diaphragm valve, wherein the device is adjustable in response to inlet pressure to change the amount of travel, such that a flow rate of water flowing from the outlet of the thermostatic cartridge to the mixer valve outlet is unaffected by changes in water supply pressure.

5. The mixer valve of claim 2, wherein the diaphragm is formed of a flexible material, and wherein the diaphragm is a rolling edge diaphragm.

6. The mixer valve of claim 2, wherein the diaphragm separates an outlet chamber on a first side of the diaphragm from a control chamber on a second side of the diaphragm, wherein the outlet chamber is in fluid communication with the mixer valve outlet, and wherein the diaphragm controls flow of water from the outlet of the thermostatic cartridge to the outlet chamber.

7. The mixer valve of claim 6, wherein the diaphragm valve includes a leak path between the outlet chamber and the control chamber.

8. The mixer valve of claim 7 wherein the leak path is formed in a bleed hole in the diaphragm, wherein a guide member is arranged to guide the movement of the diaphragm such that the movement is substantially linear between the open and closed positions of the diaphragm valve, and wherein the guide member is received in the bleed hole in the diaphragm.

9. The mixer valve of claim 6, wherein a bypass, separate from the diaphragm, controls flow of water from the control chamber to the outlet chamber in response to actuation of the push button to control the pressure differential across the diaphragm for opening and closing the diaphragm valve.

10. The mixer valve of claim 9 wherein the bypass and push button are part of the mixer valve.

11. The mixer valve of claim 9 wherein the bypass and push button are configured for remote operation of the mixer valve.

12. The mixer valve of claim 9, wherein the control chamber communicates with an inlet of the bypass and the outlet chamber communicates with an outlet of the bypass.

13. The mixer valve of claim 12, wherein the bypass comprises a bypass valve controlling flow of water from the inlet to the outlet of the bypass, and wherein the inlet and the outlet of the bypass are isolated when the bypass valve is closed to prevent flow of water from the control chamber to the outlet chamber and the inlet and outlet of the bypass are connected when the bypass valve is open to allow flow of water from the control chamber to the outlet chamber.

14. The mixer valve of claim 13, wherein the push button is arranged for actuating movement in the first direction.

15. The mixer valve of claim 13, wherein the bypass valve is operatively connected to the push button by an indexing mechanism configured to control movement of the bypass valve member to open and close the bypass in response to actuation of the push button, and wherein each actuation of the push button causes a changeover in the position of the bypass valve between the closed and open positions.

16. The mixer valve of claim 15, further comprising a rotatable control member for actuating the thermostatic cartridge to control at least temperature or flow rate of water delivered from the outlet of the thermostatic cartridge to the mixer valve outlet,
wherein the indexing mechanism comprises a first element coupled to the push button and a second element coupled to the rotatable control member; and
wherein the first and second elements of the indexing mechanism are arranged concentrically around a central axis to be linearly displaced relative to each other along the central axis and rotationally displaced relative to each other around the central axis.

17. The mixer valve of claim 16, wherein at least one of:
the first element of the indexing mechanism is configured for linear displacement relative to the second element, independently of the relative rotational displacement of the first element of the indexing mechanism and the second indexing element of the indexing mechanism; or
wherein the second element of the indexing mechanism is configured for rotational displacement relative to the first element of the indexing mechanism, independently of the relative liner displacement of the first element of the indexing mechanism and the second element of the indexing mechanism.

18. The mixer valve of claim 13, wherein the bypass valve comprises a bypass valve member movable between a closed position preventing flow through the bypass and an open position allowing flow through the bypass, wherein the bypass valve member is movable between the closed and open positions in response to actuation of the push button, and wherein the bypass valve member is urged to one of the closed and open positions by biasing means.

19. The mixer valve of claim 18, wherein the bypass valve member is received in a bypass chamber within at least a portion of the mixer valve body, and wherein the bypass chamber is located between the front and rear end of the body.

20. The mixer valve of claim 1, further comprising a device responsive to fluid pressure, wherein the device responsive to fluid pressure is arranged to open when fluid pressure reaches a pre-determined level, to vent the pressure and protect the housing from a critical pressure.

* * * * *

UNITED STATES PATENT AND TRADEMARK OFFICE
CERTIFICATE OF CORRECTION

PATENT NO. : 10,927,971 B2  
APPLICATION NO. : 15/781657  
DATED : February 23, 2021  
INVENTOR(S) : Oliver Jones Page 1 of 1

It is certified that error appears in the above-identified patent and that said Letters Patent is hereby corrected as shown below:

In the Claims

Claim 17, Column 16, Line 31: remove the word "indexing" after the word "second" and before the word "element".

Signed and Sealed this  
Twenty-fifth Day of May, 2021

Drew Hirshfeld  
*Performing the Functions and Duties of the*  
*Under Secretary of Commerce for Intellectual Property and*  
*Director of the United States Patent and Trademark Office*